Nov. 16, 1937.  W. A. HILDYARD  2,099,481

RECIPROCATING ENGINE OR PUMP

Filed March 26, 1936

Inventor
William A. Hildyard
By Jas Smirie
Atty.

Patented Nov. 16, 1937

2,099,481

UNITED STATES PATENT OFFICE 2,099,481

RECIPROCATING ENGINE OR PUMP

William Aubrey Hildyard, Brunswick, Australia, assignor to Strate-Stroke Pumps and Engines Proprietary Limited, Footscray, Victoria, Australia, a company of Australia Application March 26, 1936, Serial No. 71,014
In Australia April 4, 1935

1 Claim. (Cl. 74—50)

This invention relates to an improved engine or pump of the reciprocating type and may be designed as an internal combustion engine, a steam engine, air compressor, pump or the like.

In reciprocating engines or pumps of common construction, a single crankshaft is used and the piston is coupled to the crankshaft by a connecting rod which is pivotally movable both at its point of connection to the crankshaft and its connection to the gudgeon pin of the piston. In the reciprocation of the piston, the connecting rod assumes oblique or inclined positions alternately on opposite sides of the centre or axial line of the engine and so causes the piston to be forced hard first against one side of the cylinder and then against the other causing uneven wear on the cylinder and in some cases a knocking sound known as piston slap. Moreover, the obliquity or inclination of the connecting rod affects the balance of the engine or pump and increases vibration and wear.

The present invention has been devised to provide an improved construction of engine or pump wherein the defects caused by the obliquity of the connecting rod are eliminated so that the consequential uneven wear on the cylinder walls is avoided. The invention also improves the general balance of the reciprocating engine or pump and enables it to operate more smoothly with less friction and vibration.

The improved engine or pump is characterized by having two crankshafts adapted to rotate in opposite directions and connected to the same piston or pistons. The piston may be connected to the crankshafts by means of two connecting rods arranged on opposite sides of the axial or centre line of the engine or pump so that the obliquity of one connecting rod is balanced by the obliquity of the other connecting rod, or the piston can be combined with a rigid connecting rod and a cross head or the like to form a unit which reciprocates as a single element and has slotways to receive the crank-pins of the two crankshafts so that the crank-pins are actuated in the movement of the crosshead to rotate the crankshafts in opposite directions.

In the accompanying drawing to which reference is now made for the purpose of further description:—

Figure 1:
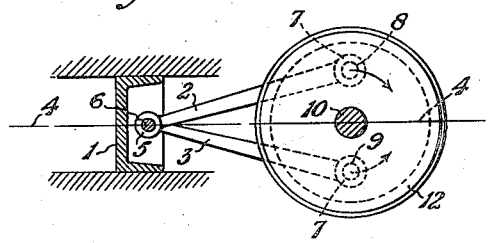
Fig. 1 is a diagrammatic view of one form of the improved engine or pump.
Figure 2:
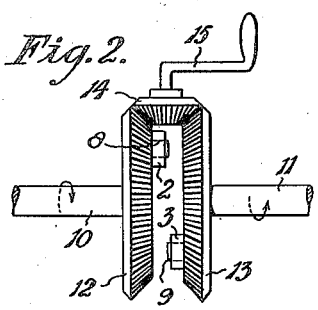
Fig. 2 is an end view of Fig. 1.

In the construction of engine or pump shown in Figs. 1 and 2, the piston 1 has two connecting rods 2 and 3 arranged one on each side of the centre line 4 of the engine or pump. Both connecting rods are connected at their inner or small ends 5 to the same gudgeon pin 6 of the piston while their big ends 7 are connected to the respective crank-pins 8 and 9 of the oppositely rotating crankshafts 10 and 11. The crank-pins are preferably carried on bevel gear wheels 12 and 13 secured on the shafts 10 and 11 but in some cases said pins may be carried by crank arms.

The crankshafts are arranged in axial alignment and the crank pins are positioned diametrically opposite to each other so that the connecting rods 2 and 3 operate on opposite sides of the centre line 4 of the engine and always maintain equal angles of obliquity.

In the operation of the engine, the force applied on the piston 1 is transmitted through the two connecting rods 2 and 3 to the crankshafts 10 and 11 causing them to be rotated in opposite directions as shown by the arrows in Fig. 1. In the reciprocatory movement of the piston the connecting rods always maintain the same angle of obliquity on opposite sides of the centre line 4 of the engine and converge upon each other while passing at the dead centre positions. The tangential thrust of one connecting rod on the piston is thus balanced by the tangential thrust of the other connecting rod in the opposite direction so that the thrust on the piston is at all times applied in a straight line and the piston maintained straight and true within the cylinder. Uneven wear of the cylinder walls is thus avoided and piston slap prevented.

The use of the two connecting rods and the two crankshafts rotating in opposite directions improves the general balance of the engine or pump and so reduces vibration and excessive wear.

Each crankshaft may have a separate flywheel and, if desired the bevel gear wheels 12 and 13 may be made sufficiently heavy to act as flywheels. In the case of an engine a suitable gear arrangement may be provided whereby a forward drive is obtained from one crankshaft and a reverse drive from the other. Alternatively, both crankshafts may be geared to a common drive shaft, one crankshaft being geared direct and the other crankshaft geared through a reversing pinion so that a uni-directional drive is transmitted to the common shaft.

To ensure rotation of the crankshafts in the correct directions when starting the engine or pump, the bevel gear wheels 12 and 13 may be geared together by a pinion 14. The pinion may be left constantly in mesh with the wheels 12 and 13 or it could be made retractible so as to be brought out of mesh when desired. A handle 15 may be provided for retracting the pinion or for rotating the latter to rotate the crankshafts in starting the engine or pump.

Figure 3:
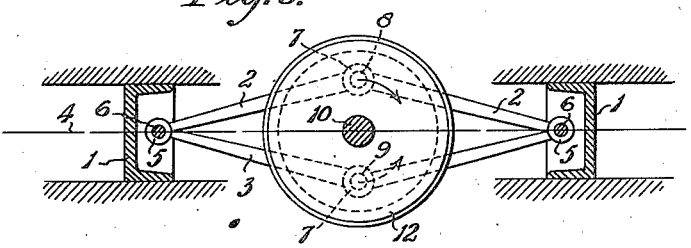
Fig. 3 is a view of the engine or pump when constructed with two cylinders arranged in diametrically opposed arrangement.

In the construction of engine or pump shown in Fig. 3, two diametrically opposed pistons 1 are used and each is connected to the two oppositely rotating crankshafts 10 and 11 by two connecting rods 2 and 3. Otherwise the construction is similar to the previously described.

Figure 4:
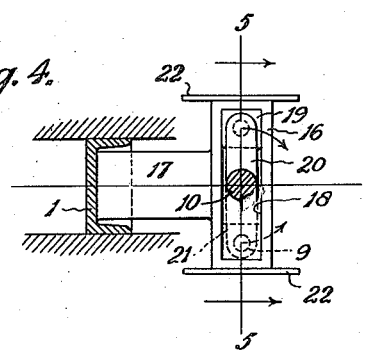
Fig. 4 is a diagrammatic view of another form of the improved engine or pump.
Figure 5:
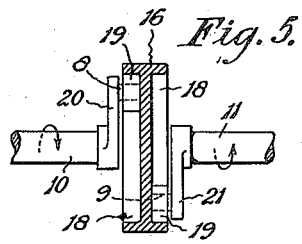
Fig. 5 is a section on the line 5—5 of Fig. 4.

According to the form of the invention shown in Figs. 4 and 5, the piston is connected to a crosshead 16 by means of a rigid connecting rod 17. The crosshead has vertical slotways 18 in its opposite sides to receive slide blocks 19 to which the crank-pins 8 and 9 are connected. The crank-pins are carried by crank arms 20 and 21 on the two crankshafts 10 and 11 which are arranged in axial alignment similar to the previous construction.

The piston 1, connecting rod 17 and crosshead 16 form a combined structure which reciprocates as a single unit. The structure may be made as one integral unit or casting or the piston may for convenience be constructed separately and rigidly secured to the other portion of the unit.

In the operation of this form of engine, the combined structure consisting of the piston, connecting rod and crosshead reciprocates as a unit and the slide blocks 19 and crank-pins are caused to travel up and down within the vertical slotways 18 of the crosshead. The slotways and crank-pins convert the reciprocating movement of the piston to rotary motion which is transmitted to the crankshafts 10 and 11 causing said shafts to be rotated in opposite directions.

Figure 6:
Fig. 6 shows the form of engine or pump in Fig. 4 constructed with two opposed cylinders.

In the case of a two cylinder engine or pump as shown in Fig. 6, the construction is similar except that the crosshead 16 is positioned centrally between the two cylinders and is combined with the two connecting rods 17 and pistons to form one structure which reciprocates as a unit. The crosshead actuates both crankshafts in a manner similar to that previously described.

Suitable slide surfaces as 22 may be provided to guide and support the crosshead 16 in its reciprocatory movement.

With the form of engine or pump shown in Figs. 4 to 6, oblique connecting rods are eliminated and piston slap, uneven wear on cylinder walls and other defects resulting from the obliquity of connecting rods are avoided. Moreover, as the crank-pins of the two oppositely rotating crankshafts are arranged diametrically opposite to each other, the general balance of the engine is improved and vibration and wear reduced.

What I claim is:

A reciprocating engine or pump comprising a piston slidable in a cylinder, a crosshead slidable between guides and having a slotway in each of its opposite faces, a connecting rod rigidly connecting the piston and crosshead to form a combined structure which reciprocates as a unit, two axially aligned crankshafts arranged one on each side of the crosshead and adapted to rotate in opposite directions, crank arms on said crankshafts, and crank-pins on said arms each operating in one of the opposite slotways of the crosshead.

WILLIAM AUBREY HILDYARD.